United States Patent [19]
Yasukawa et al.

[11] Patent Number: 5,189,466
[45] Date of Patent: Feb. 23, 1993

[54] INFORMATION SETTING APPARATUS IN A CAMERA

[75] Inventors: Seiichi Yasukawa; Takashi Saegusa, both of Kawasaki, Japan

[73] Assignee: Nikon Corporation, Tokyo, Japan

[21] Appl. No.: 801,893

[22] Filed: Dec. 3, 1991

[30] Foreign Application Priority Data

Dec. 20, 1990 [JP] Japan .................................. 2-412471

[51] Int. Cl.$^5$ .............................................. G03B 17/00
[52] U.S. Cl. .................................. 354/412; 354/289.12
[58] Field of Search ................. 354/412, 289.1, 289.12

[56] References Cited

U.S. PATENT DOCUMENTS

| | | | |
|---|---|---|---|
| 4,455,068 | 6/1984 | Izuhara | 354/412 |
| 4,676,624 | 6/1987 | Kiuchi et al. | 354/412 X |
| 4,853,733 | 8/1989 | Watanabe et al. | 354/412 |
| 5,019,851 | 5/1991 | Azuma et al. | 354/412 X |
| 5,040,016 | 8/1991 | Ishikawa et al. | 354/412 |
| 5,097,283 | 3/1992 | Kazumi | 354/412 |

Primary Examiner—W. B. Perkey
Attorney, Agent, or Firm—Shapiro and Shapiro

[57] ABSTRACT

An information setting apparatus in a camera is provided with a selecting operation device having a plurality of operating portions operated to select one of a plurality of functions when the set values of the plurality of functions are to be changed, a changing operation device operated to change the set value of the selected function, a resetting operation device having an operating portion for resetting all of the set values of the plurality of functions to a predetermined standard value, and individual function resetting device for resetting only the selected function to the predetermined standard value when one of the operating portions of the selecting operation device and the resetting operation device are operated together.

5 Claims, 17 Drawing Sheets

```
PSAM      CUSTOM
MUCWSP    SET?CLR?
ISO       ⊡+8.8
DX 8888 F8.8
S CL CH   [88]
```

```
P
MU
          ⊡+0.7
DX  250 F5.6
S         [36]
```

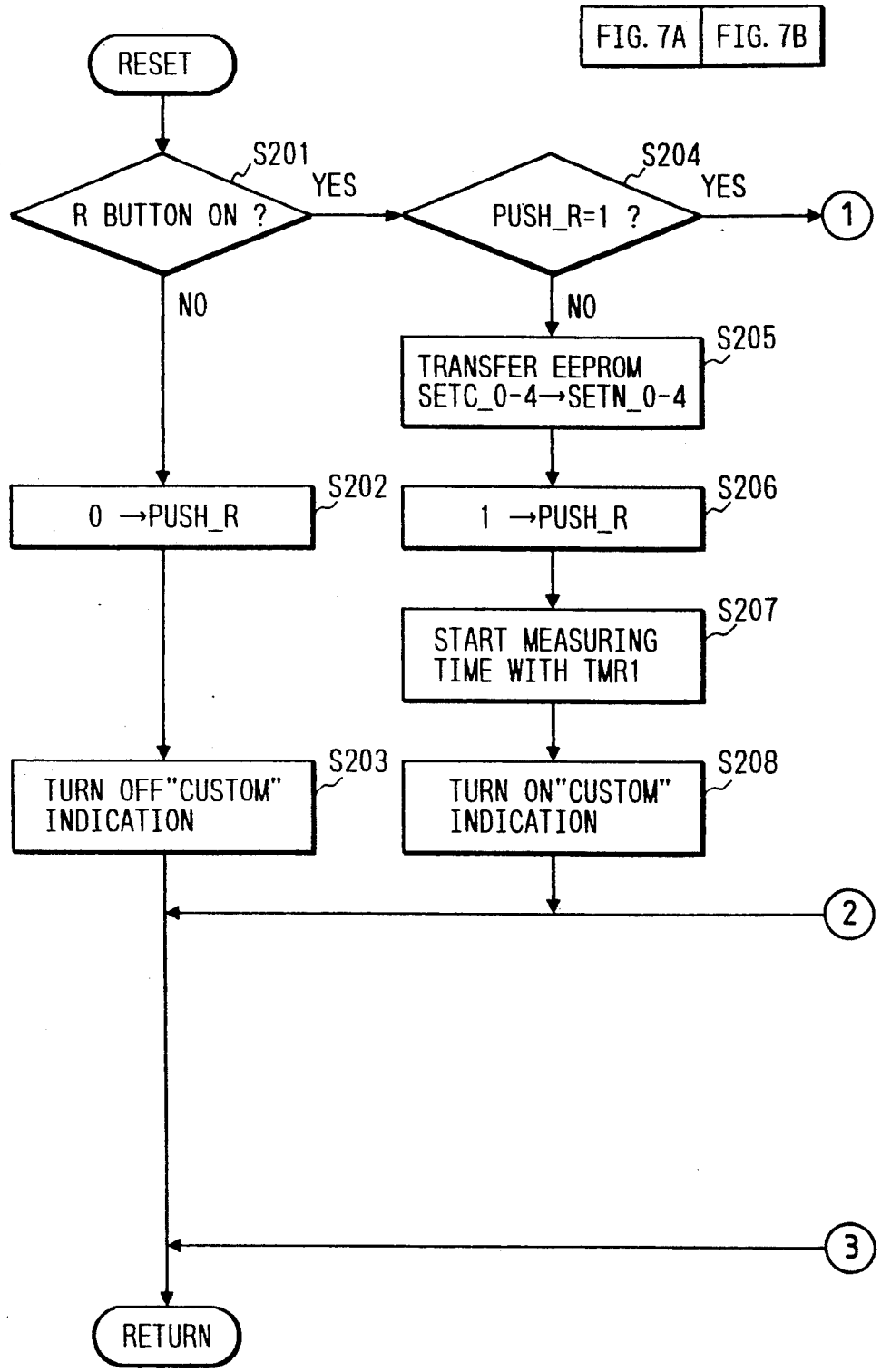

FIG. 8

| EEPROM (NON-VOLATILE MEMORY) AREA | | | | RAM AREA | |
|---|---|---|---|---|---|
| ADDRESS | LABEL | ADDRESS | LABEL | ADDRESS | LABEL |
| FF00 | SETN_0 | FF06 | SETC_0 | FE00 | BIT0:PUSH_R |
| FF01 | SETN_1 | FF07 | SETC_1 | | |
| FF02 | SETN_2 | FF08 | SETC_2 | | |
| FF03 | SETN_3 | FF09 | SETC_3 | | |
| FF04 | SETN_4 | FF0A | SETC_4 | | |
| FF05 | SETTV | FF0B | | | |

FIG. 9

| SETN_0 | EXPOSURE MODE | INDICATION |
|---|---|---|
| 0 | PROGRAM | P |
| 1 | SHUTTER-PRIORITY | S |
| 2 | APERTURE-PRIORITY | A |
| 3 | MANUAL | M |

FIG. 10

| SETN_1 | FILM SPEED | INDICATION |
|---|---|---|
| 0 | DX MODE | DX+VALUE |
| 1 | MANUAL ISO 6 | 6 |
| 2 | MANUAL ISO 8 | 8 |
| ⋮ | | |
| 30 | MANUAL ISO 5000 | 5000 |
| 31 | MANUAL ISO 6400 | 6400 |

FIG. 11

| SETN_2 | FILM WINDING MODE | INDICATION |
|---|---|---|
| 0 | SINGLE | S |
| 1 | CONTINUOUS (LOW) | CL |
| 2 | CONTINUOUS (HIGH) | CH |

FIG. 12

| SETN_3 | LIGHT METERING MODE | INDICATION |
|---|---|---|
| 0 | MULTI-PATTERN | MU |
| 1 | CENTER-WEIGHTED | CW |
| 2 | SPOT | SP |

FIG. 13

| SETN_4 | EXPOSURE COMPENSATION AMOUNT | INDICATION |
|---|---|---|
| -9 | +3 STAGE | +3.0 |
| -8 | +(2+2/3) | +2.7 |
| -7 | +(2+1/3) | +2.3 |
| ⋮ | | |
| -1 | +(0+1/3) | +0.3 |
| 0 | 0 | 0.0 |
| 1 | -(0+1/3) | -0.3 |
| ⋮ | | |
| 7 | -(2+1/3) | -2.3 |
| 8 | -(2+2/3) | -2.7 |
| 9 | -3 | -3.0 |

(b)
```
A        CUSTOM
SP       ≋SET?≋
         ⊠-0.3
 1000 F5.6
    CH  [36]
```

(b)
```
A        CUSTOM
SP
         ⊠-0.3
  125 F1.6
    CH  [36]
```

(b)
```
A        CUSTOM
SP
                   -0.3
    125 F 1.6
CH          [ 36 ]
```

(c)
```
P        CUSTOM
MU              ≋CLR?≋
                    0.0
DX  250 F 5.6
S           [ 36 ]
```

(b)
```
A        CUSTOM
SP
                   -0.3
    125 F 1.6
CH          [ 36 ]
```

(c)
```
A        CUSTOM
SP              ≋CLR?≋
                   -0.3
    125 F 1.6
            [ 36 ]
```

(d)
```
P
MU
                    0.0
DX  250 F 5.6
S           [ 36 ]
```

INFORMATION SETTING APPARATUS IN A CAMERA

BACKGROUND OF THE INVENTION

1. Field of the Invention

This invention relates to an information setting apparatus for setting a plurality of operating modes (set values of functions) in a camera wherein said operating modes can be set and changed.

2. Related Background Art

Cameras have various operating modes (set values of functions) and cameras in which those operating modes can be selected by the user's operation are popular. For example, with regard to the exposure control mode, the changeover of program AE, shutter-priority AE, etc. is possible. Also, the changeover of one-frame photographing and continuous photographing, the setting of film speed, the setting of exposure compensation amount, etc. can all be arbitrarily set by the user with the aid of operating members for respective functions selected.

Such cameras are satisfactory in that a number of functions can all be set as the user desires, but after the user has changed over the camera from its standard set state to each kind of mode the user desires to use, it is cumbersome to restore the camera to the original state. So, there are cameras designed such that if the user operates one or one set of operating members provided to restore a plurality of settings together to the standard state, the camera will be reset in a moment.

However, the user's way of using a camera is diversified and there may occur a case where the set substance reset by one operation is unsatisfactory if it is the regular standard setting prepared by the maker of the camera. That is, if all operating modes are changed to a regular combination, a further operation will become necessary to bring about a mode to which the user desires to adjust the camera, and this is cumbersome, but yet it it also cumbersome to re-adjust individual operating modes one by one. Like this, even a camera in which the operating modes are all reset to the standard state by one operation is not always improved in the ease with which the user uses the camera.

As a method for solving the above-noted problem, there is a camera designed such that the user arbitrarily customizes the set values of various functions by an accessory (for example, an IC card) attached to the camera and the camera memorizes these set values. Again in this case, the operation of mounting and dismounting the accessory is cumbersome, and when the accessory is removed, the memorized substances can no longer be changed and thus, such a camera also is difficult to use.

SUMMARY OF THE INVENTION

It is an object of the present invention to provide an information setting apparatus in a camera which is easy for the user to select the set values of functions such as operating modes and which is truly easy to use.

In a preferred embodiment of the present invention, when any function is selected by a selecting operation device and a resetting operation device is operated, only the set value of a function which it is desired to restore to the standard setting is reset with functions such as operating modes which need not be changed remaining unchanged.

In another embodiment of the present invention, without any accessory or the like being mounted and without a setting operation device for exclusive use being added, an existing other operation device (a first operation device) and a second operation device are operated together, whereby a combination of custom settings peculiar to the user is set and memorized.

In still another embodiment of the present invention, the first operation device is an AE locking button, whereby the goodness of operability for effecting custom setting can be secured without the AE locking function being limited.

In yet still another embodiment of the present invention, when a custom set value is renewed by the operation of a resetting operation device and further, the resetting operation device is operated for a first time or longer, a demand signal for resetting the custom set value to a standard value is produced, and when the resetting operation device is once released and is again operated, the custom set value is reset to the standard value. As the result, when it is desired to once release the custom setting itself and restore it to a standard state, it becomes easily possible. Also, even in a system wherein the change itself of the custom setting is impossible unless by an extraneous accessory, the release thereof becomes possible by a camera body alone.

In a further embodiment of the present invention, when the resetting operation device is operated for a relatively long time and thereafter is once released, and then is operated for a relatively short time, the custom set value is reset to the standard value. Accordingly, there is realized an operating method which secures the safety with which the operation of releasing the custom set value itself is not readily performed by mistake and yet which does not give the feeling of discomfort for the waiting time to the user.

BRIEF DESCRIPTION OF THE DRAWINGS

FIG. 7 comprising FIGS. 7A and 7B are flow charts showing a set resetting subroutine.

FIG. 8 shows an example of the address mapping in a memory.

FIG. 9 shows an example of the allotment of a pointer SETN_0.

FIG. 10 shows an example of the allotment of a pointer SETN_1.

FIG. 11 shows an example of the allotment of a pointer SETN_2.

FIG. 12 shows an example of the allotment of a pointer SETN_3.

FIG. 13 shows an example of the allotment of a pointer SETN_4.

FIG. 21 shows various examples of the indication by the indication panel of the camera.

FIG. 22 shows various examples of the indication by the indication panel of the camera.

FIG. 23 shows various examples of the indication by the indication panel of the camera.

FIG. 24 shows various examples of the indication by the indication panel of the camera.

DESCRIPTION OF THE PREFERRED EMBODIMENTS

Figures 1, 2, 3:
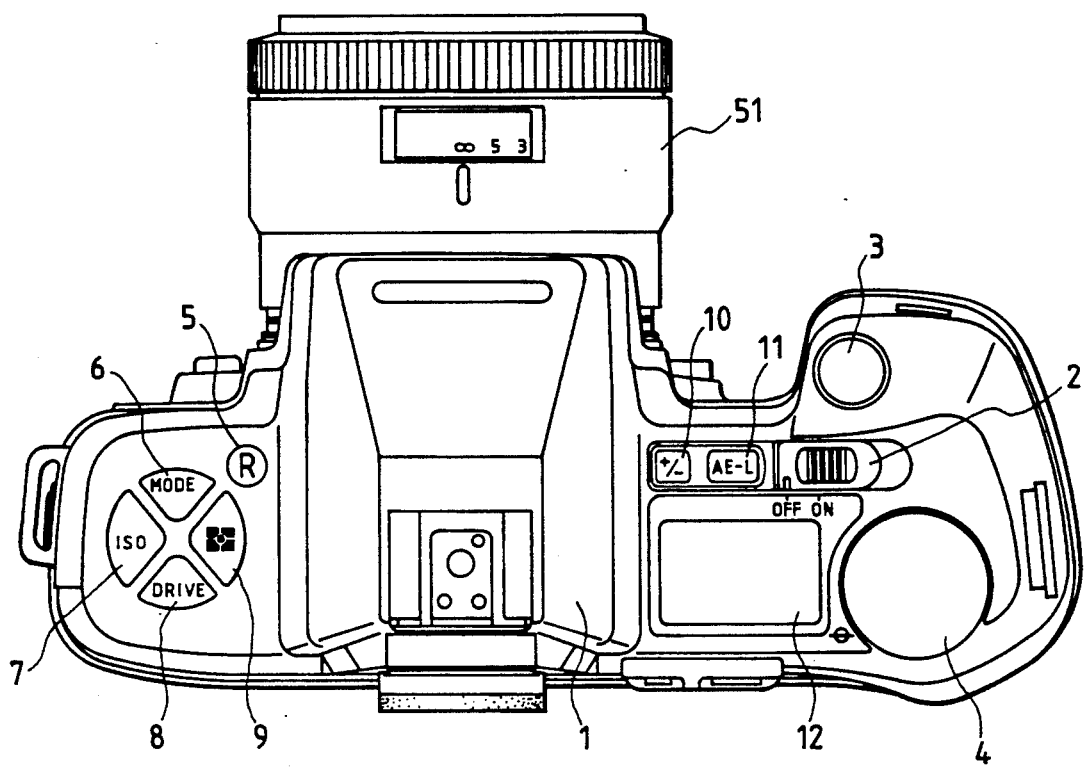
FIG. 1 shows the arrangement of the operating members of a camera.
FIG. 2 shows various examples of the indication by the indication panel of the camera.
FIG. 3 shows various examples of the indication by the indication panel of the camera.

FIG. 1 is a pictorial view for showing the operating members of a camera according to an embodiment of the present invention. The reference numeral 1 designates a camera body, and the reference numeral 51 denotes an interchangeable lens. Operating members which will hereinafter be described are provided on the upper surface of the camera body 1. The reference numeral 2 designates a main switch for switching on/off the operation itself of the camera, the reference itself of the camera, the reference numeral 3 denotes a shutter release button, and the reference numeral 4 designates a dial for changing the modes and set values of various functions. The reference numeral 5 denotes a reset button (hereinafter referred to as the "R button") for resetting a combination of operation modes, the reference numeral 6 designates a MODE button for permitting the change of the exposure mode, the reference numeral 7 denotes an ISO button for permitting the change of film speed, the reference numeral 8 designates a DRIVE button for permitting the change of the winding mode, the reference numeral 9 denotes a light metering mode button for permitting the change of the light metering mode, and the reference numeral 10 designates an exposure compensation button for permitting the change of an exposure compensation amount. The reference numeral 11 denotes an AE locking button for fixing an exposure value based on the result of light metering. The reference numeral 12 designates an indicator for intensively indicating various operation modes, the exposure value, etc.

FIG. 2 shows all patterns that can be indicated by the indicator 12, and the meanings of the respective indicated substances will be described later, but a typical example of the indication is shown in FIG. 3. The indication shown in FIG. 3 shows that the exposure mode is a program, the light metering mode is a multi-pattern, the film speed is set by DX, the winding mode is single, the exposure compensation amount is +0.7 step, the current exposure value is a shutter speed 1/250 sec. and aperture F5.6, and the film counter is at the thirty-sixth frame.

Figure 4:
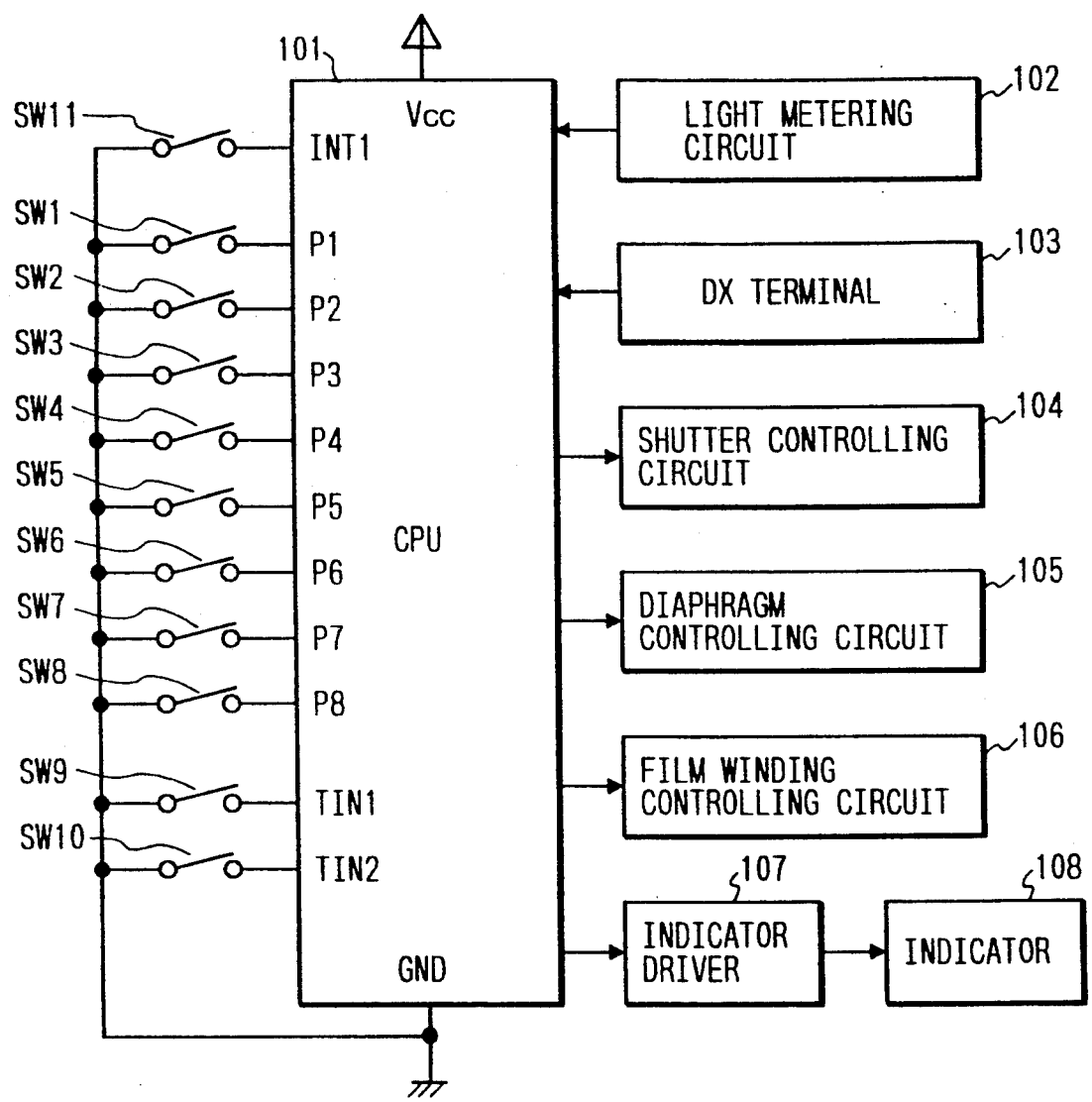
FIG. 4 is a block diagram showing the construction of electric circuits.

FIG. 4 is a block diagram of electric circuits centering around a microcomputer (hereinafter referred to as the "CPU") for detecting the operations of the operating members shown in FIG. 1 and driving the indicator, and controlling each unit concerned in the functions of the camera. SW11 designates a switch operatively associated with the main switch and adapted to be closed in ON position. The CPU 101 inputs this to the terminal of an input port INT1 having the interrupting function. SW1–SW8 denote switches operatively associated with the release, reset, MODE, ISO, DRIVE, light metering mode, exposure compensation and AE locking buttons 5–11, respectively, and adapted to be closed when the respective buttons are depressed. The CPU 101 inputs the signals of the switches SW1–SW8 to the terminals of input ports P1–P8, respectively. SW9 and SW10 designate two-phase rotation detecting switches provided to detect the amount of rotation of the dial 4. When the dial 4 is rotated by an amount corresponding to a predetermined click, these switches SW9 and SW10 change to OFF→ON→OFF in a phase relation determined by the direction of the rotation. The CPU 101 inputs these by timer counter input terminals TIN1 and TIN2 having a two-phase up-down counter function. All the above-described input terminals of the CPU contain pull-up resistors therein, and when the switches are ON, the input voltage level L is detected, and when the switches are OFF, the input voltage level H is detected.

The indicator 12 of FIG. 1 is designated by 108 in the block diagram of FIG. 4, and it is driven by an indicator driver 107 which has received a signal output from the CPU 101. The reference numeral 102 denotes a light metering circuit which transmits the distribution light metering information of the brightness of the object field to the CPU 101. The reference numeral 103 designates DX terminal which transmits to the CPU 101 the ON and OFF of the DX code of film contained in a film cartridge chamber as a plurality of bits of signals. The CPU 101 sends a signal to circuits 104 and 105 for controlling a shutter and a diaphragm which govern the exposure of the camera, and also sends a signal to a film winding controlling circuit 106 for winding the film after the exposure.

The operations of the circuits shown in the block diagram of FIG. 4 will now be described along the description of the program of the CPU 101.

Figures 5, 5A:
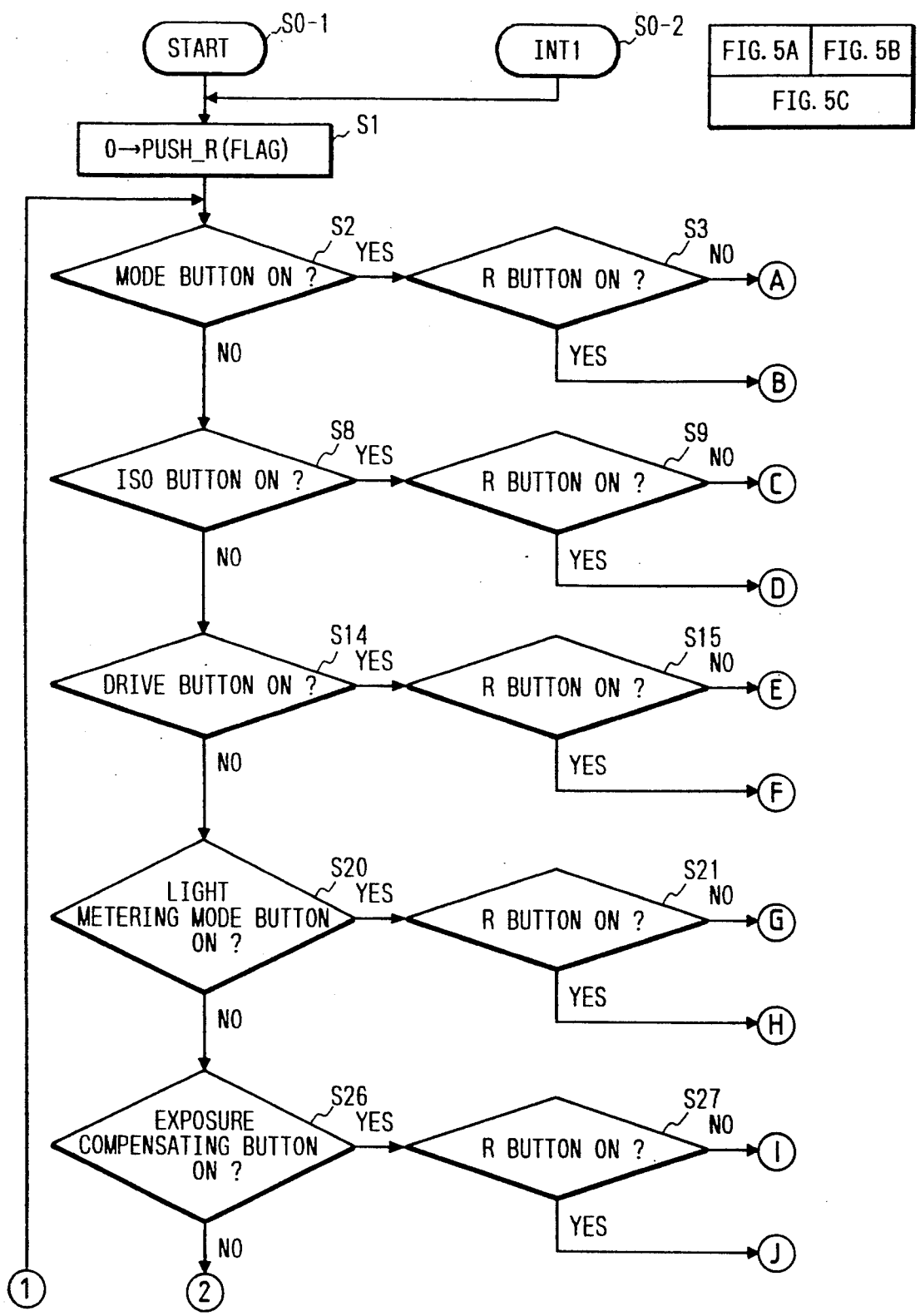
FIG. 5 comprising
FIGS. 5A–5C are the main flow charts of a CPU in an embodiment of the present invention.
Figure 5B:
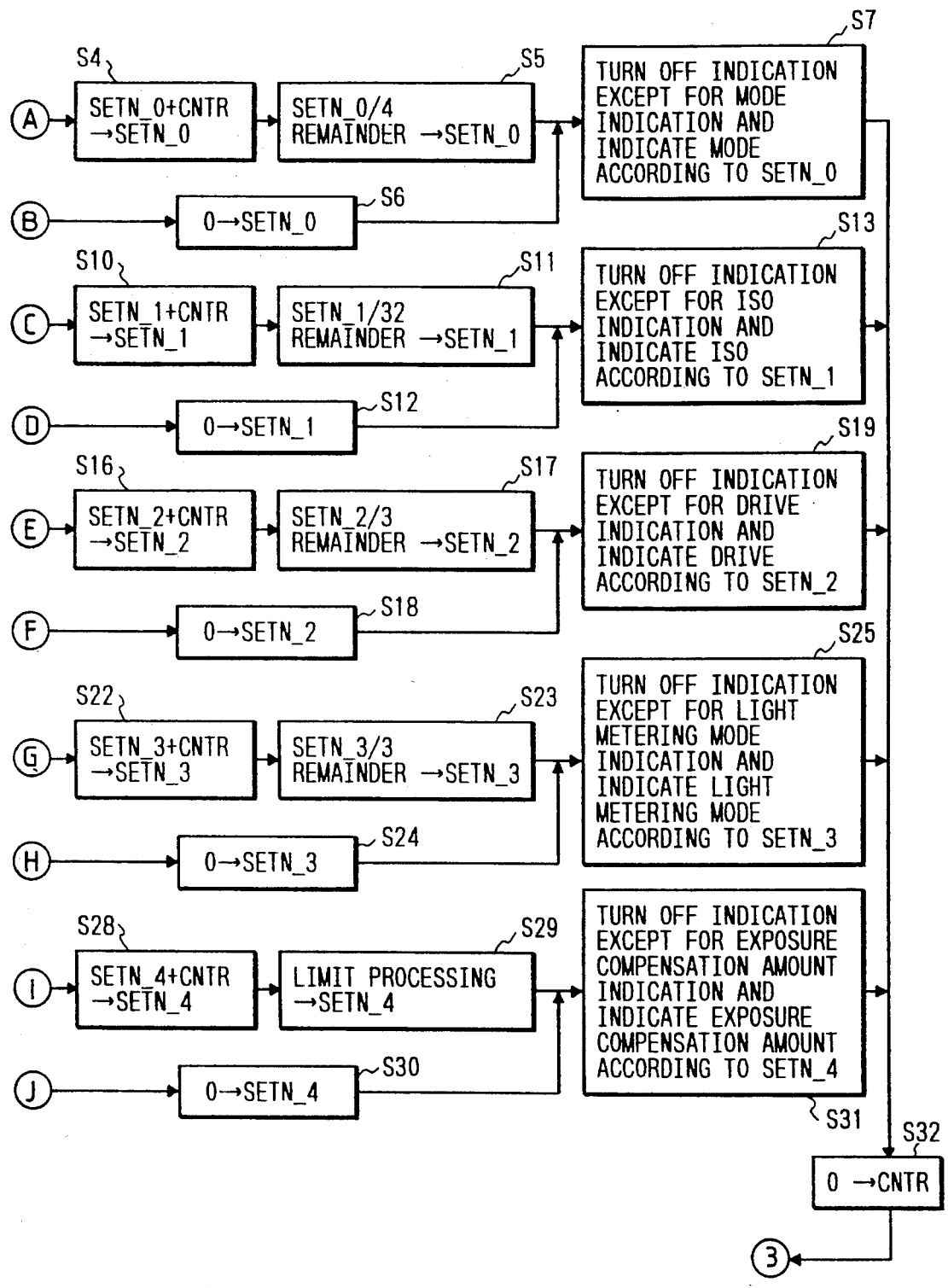
Figure 5C:
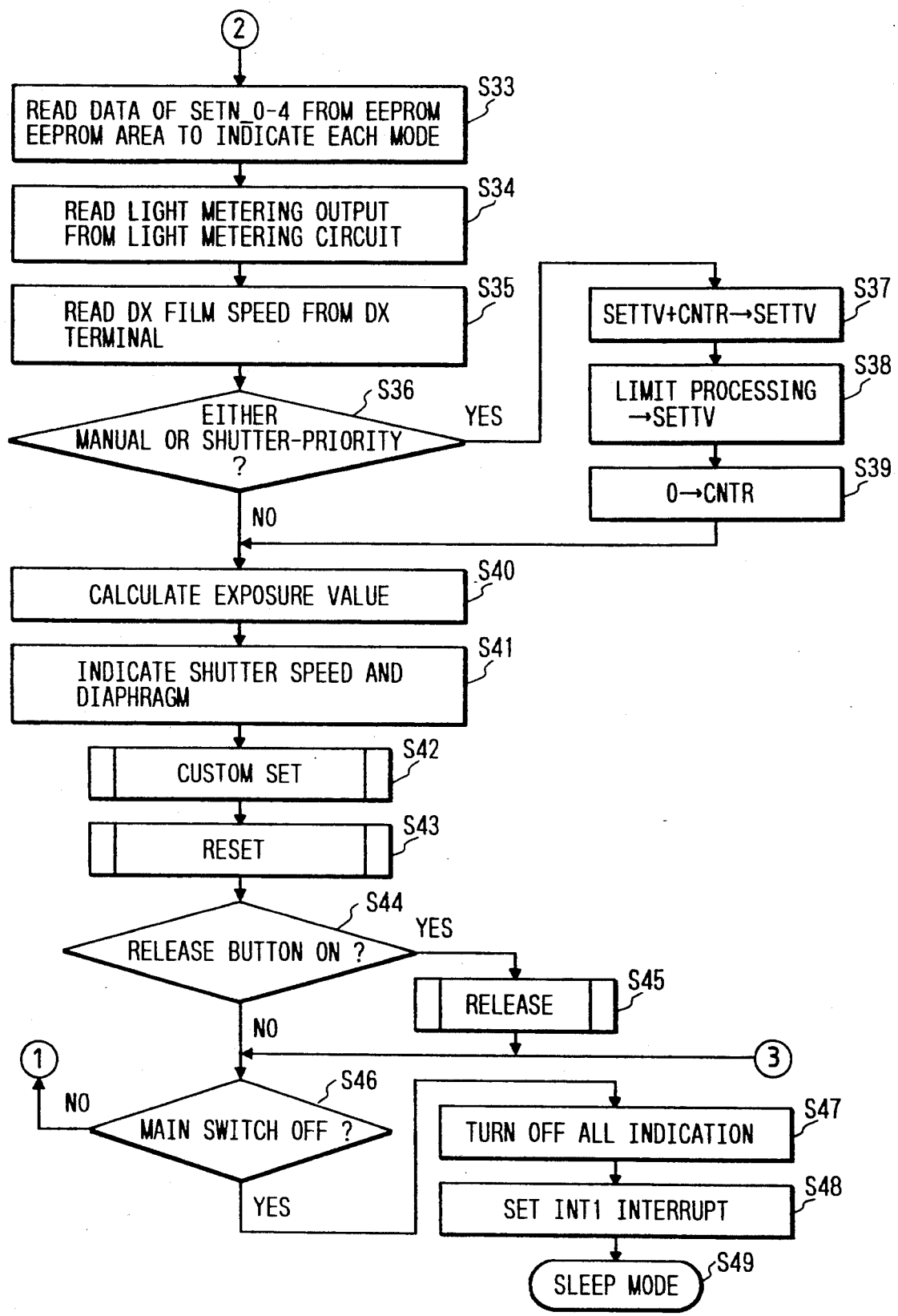
Figure 6:
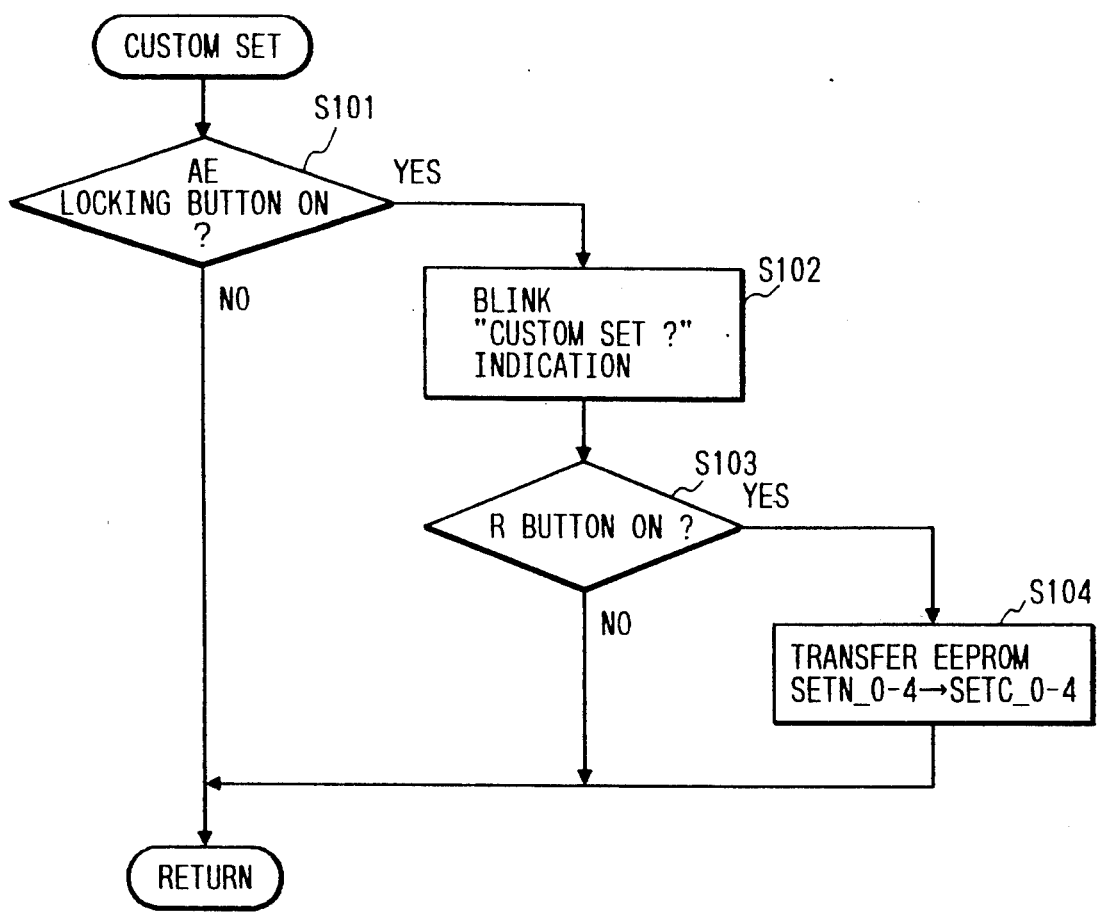
FIG. 6 is a flow chart showing a custom setting subroutine.
Figure 7B:
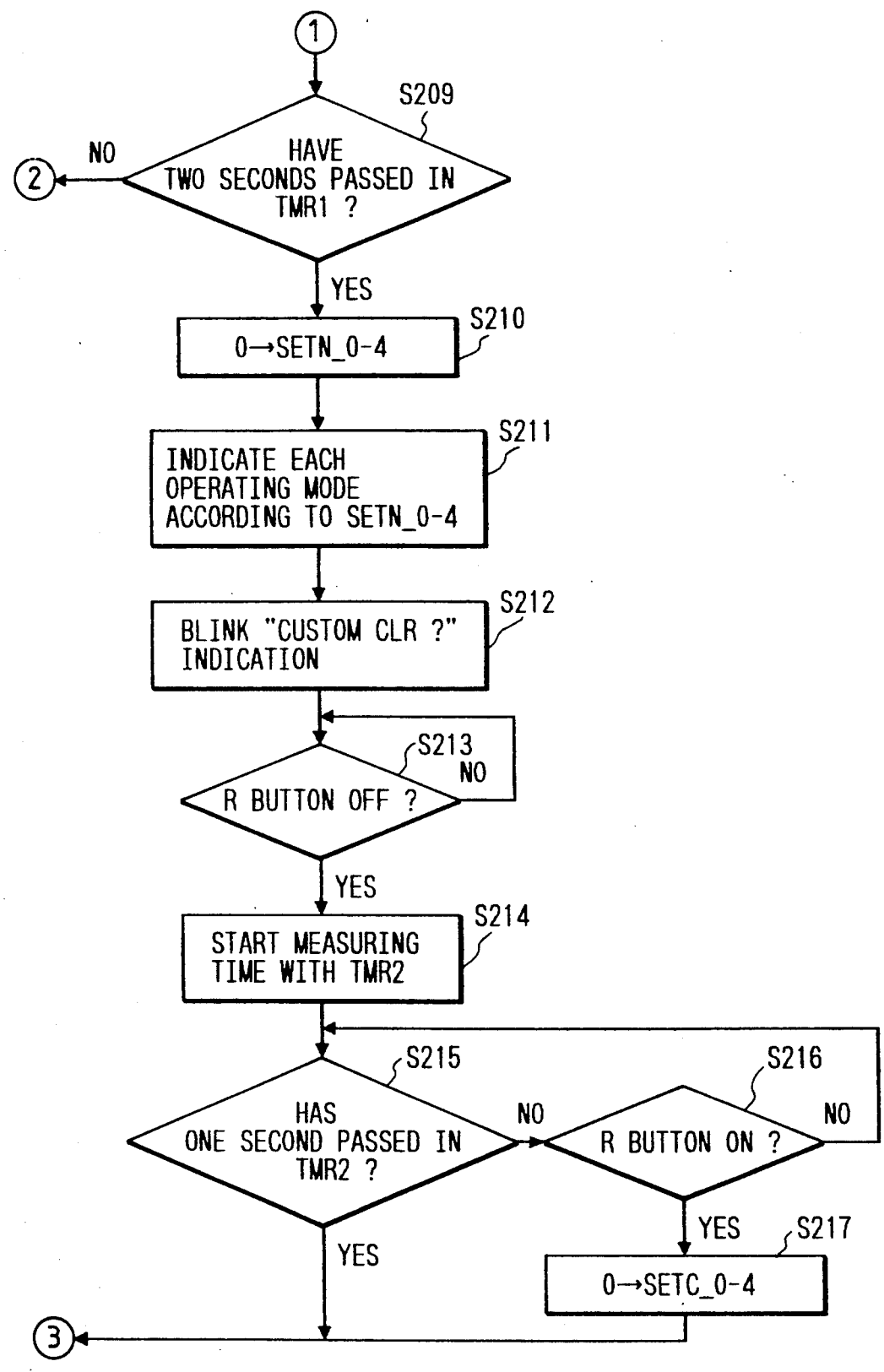

FIGS. 5A–5C, 6, 7A and 7B are flow charts showing the program of the CPU 101, FIGS. 5A–5C showing the main routine, FIG. 6 showing a custom set subroutine in the main routine, and FIGS. 7A and 7B showing a set resetting subroutine in the main routine.

Before the flow is described, the names of memories appearing in this flow and the meanings thereof will first be described.

SETN_0-4 are the names of memory portions storing therein pointers indicative of the set substances of currently set operating modes, i.e., MODE (exposure mode), ISO (film speed), DRIVE (coining mode), light metering mode and exposure compensation amount, respectively. SETC_0-4 are the names of memory portions storing therein pointers indicative of the set substances of operating modes memorized as custom setting, i.e., MODE, ISO, DRIVE, light metering mode and exposure compensation amount, respectively. SETTV is the name of a memory portion storing therein a pointer indicative of a shutter speed set by the user in the exposure mode manual and the shutter-priority mode. It is to be understood here that as the above-mentioned memories, use is made of self-contained EEPROMs (non-volatile memories capable of electrically erasing and writing), and accordingly, the contents stored therein remain after the power source is cut off. CNTR is the name of a memory portion storing therein the number (positive and negative signs) of input pulses counted by a two-phase up-down counter contained in the CPU 101. PUSH_R is the name of a flag for memorizing a state concerned with the detection of the depression of the R button. An example of the address mapping of the above-mentioned memories is shown in FIG. 8.

Of the contents of the above-mentioned memories, the allotments of the values of the pointers of SETN_0-4 are shown in FIGS. 9 to 13. The allotments of the values of these pointers are common to the allotments of SETC_0-4.

In FIGS. 5A–5C, the CPU 101 is reset after the closing of the power source switch, and at a step S1, PUSH_R which is a flag is cleared. At a step S2, whether the level of a port P3 is L, that is, whether the MODE button is depressed, is discriminated, and if the level of the port P3 is H, that is, the MODE button is not depressed, advance is made to a step S8, where the state of a port P4, i.e., the ISO button, is discriminated.

Likewise, at steps S14, S20 and S26, whether the levels of ports P5, P6 and P7 are L, that is, whether the DRIVE button, the light metering mode button and the exposure compensation button are depressed, is discriminated, and if none of these buttons is depressed, advance is made to steps S14, S20 and S26, and then advance is made to a step S33. At the step S33, the data of SETN_0-4 are read out from the memories, and as shown for example, in FIG. 5C, the states of the exposure mode, whether the film speed setting is DX, the film winding mode, the light metering mode and the exposure compensation amount are indicated on the indicator 12.

Subsequently, at a step S34, the light metering output is read from the light metering circuit, and at a step S35, the DX code of the film is read from the DX terminal. At a step S36, whether SETN_0 is 1 or 3, that is, whether the exposure mode is the shutter-priority mode or the manual mode, is discriminated, and if the answer is "No", advance is immediately made to a step S40, but if the answer is "Yes", that is, if the exposure mode is the shutter-priority mode or the manual mode, at a step S37, the content of the two-phase up-down counter CNTR is read out and is added to the memory SETTV. This means that because the pointer SETTV is a pointer indicative of the shutter speed set by the user, as described above, and the shutter speed has an upper limit and a lower limit inherent to the camera, the number of rotation clicks of the dial after this flow has been passed through last time is added to or subsracted from the pointer of the shutter speed and when the value of CNTR is not 0, the set value of the shutter speed is changed in conformity with the direction of rotation and the number of clicks. Then, at a step S38, limit processing for limiting the value of the pointer SETTV so as not to exceed the upper limit and lower limit thereof is carried out, and advance is made to a step S39, where CNTR is reset to 0 and thus, the apparatus becomes ready for the next detection of the amount of rotation.

At a step S40, the exposure value, i.e., a combination of a shutter speed and an aperture value, is calculated as required, and at a step S41, they are indicated by the indicator 12. At steps S42 and S43, the subroutines of custom set and set resetting are executed, respectively (the details of this will be described later). At a step S44, whether the level of a port P1 is L, that is, whether the release button is depressed, is discriminated, and if the level of the port P1 is L, that is, if the release button is depressed, at a step S45, the release subroutine is executed, and then advance is made to a step S46, and if the release button is not depressed, advance is immediately made to the step S46.

At the step S46, whether the level of the port INT1 is H, that is, whether the main switch is in its OFF position, is discriminated, and if the level of the port INT1 is L, that is, if the main switch is not in its OFF position, return is made to the step S2, whereby the main loop is formed. If at the step S46, the main switch is judged to be in its OFF position, at a step S47, all indications are turned off, and at a step S48, the permission of the falling interrupt of the INT1 terminal is set, and at a step S49, the sleep mode for clock stoppage is entered, and the apparatus waits for low power consumption.

Next, when the main switch is slidden to its ON position, the falling interrupt of the INT1 terminal is detected, and a vibrator, not shown, automatically starts oscillation and a clock is supplied and also, the execution of the program is resumed from the INT1 address (step S0-2) of FIG. 5A, and in the case of the present embodiment, the operation of the camera is performed in accordance with the execution from the START address (step S0-1) immediately after the resetting and a common flow.

Description will now be made of the operation when the respective buttons are depressed at the steps S2–S26.

If at the step S2, the level of the port P3 is L, that is, the MODE button is depressed, advance is made to a step S3, where whether the level of a port P2 is H, that is, whether the R button is depressed, is discriminated. If as the result of the discrimination, the level of the port P2 is H, that is, the R button is not depressed, at a step S4, the content of the two-phase up-down counter CNTR is read out and is added to the memory SETN_0, and at a step S5, the remainder of SETN_0 divided by 4 (there are four exposure modes) is substituted for by SETN_0. This means that the pointer indicative of the exposure mode is added or substracted and when the value of CNTR is 0, the exposure mode is kept as it is and when the value of CNTR is other than 0, the exposure mode is changed to endless in conformity with the direction of rotation of the dial 4 and the number of clicks. At a step S7, the indications except for the indication regarding the exposure mode are turned off and what the operating mode being now settable is is emphatically indicated. Subsequently, at a step S32, CNTR is reset to 0 in preparation for the next detection of the amount of rotation of the dial, and advance is made to a step S46, and if the main switch is in the ON position, there is formed a loop in which return is made to the step S2.

Figure 14:
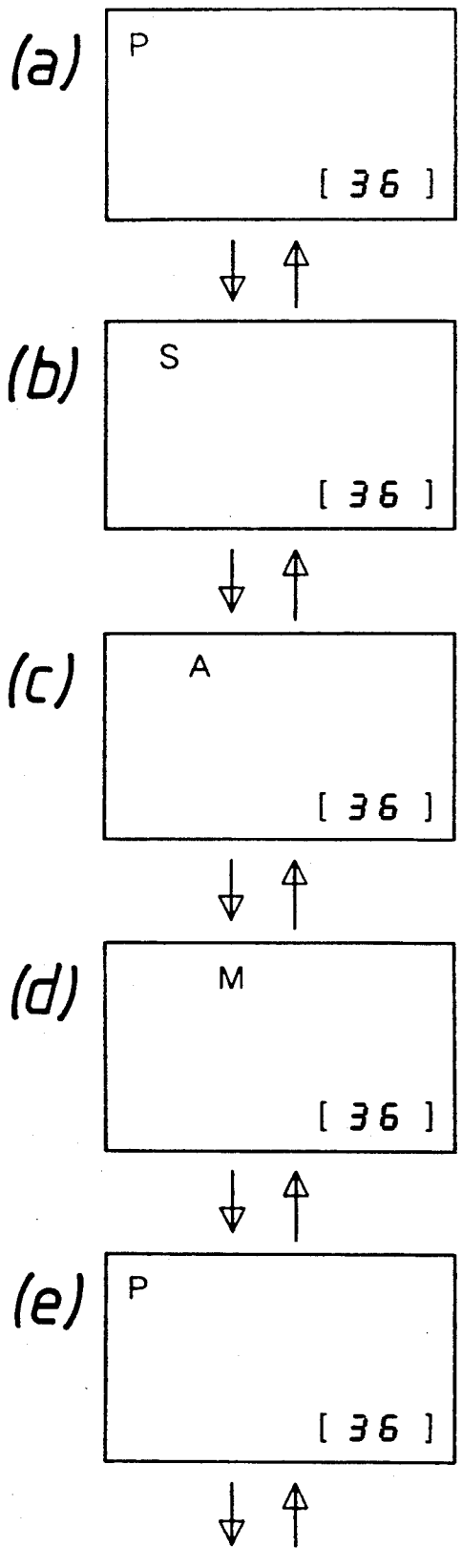
FIG. 14 shows various examples of the indication by the indication panel of the camera.
Figure 15:
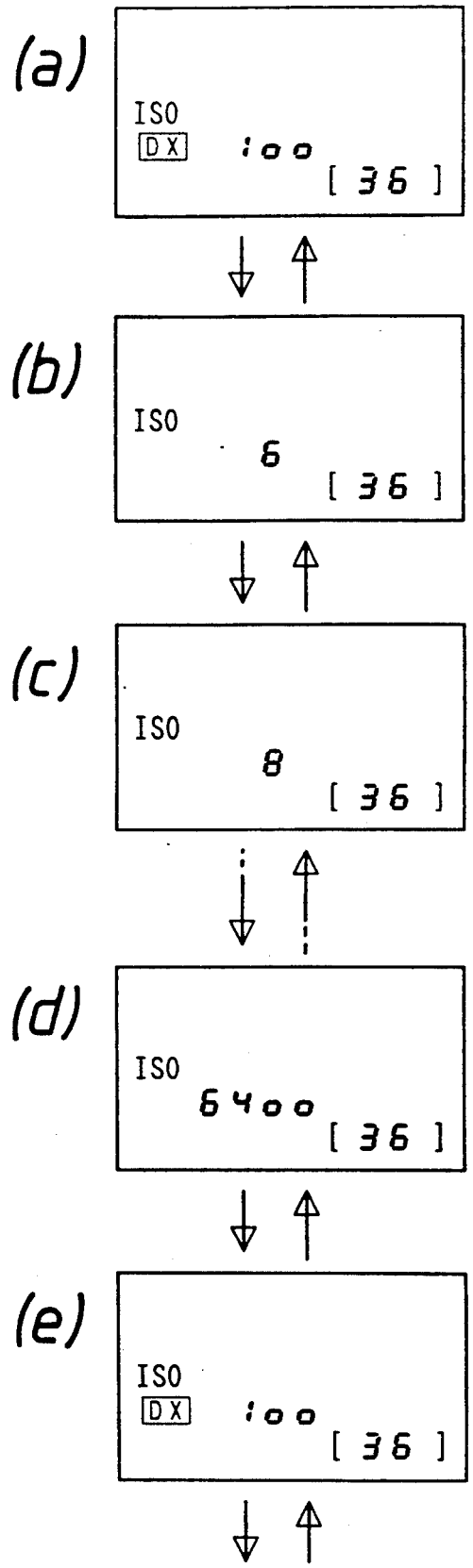
FIG. 15 shows various examples of the indication of the indication panel of the camera.
Figure 16:
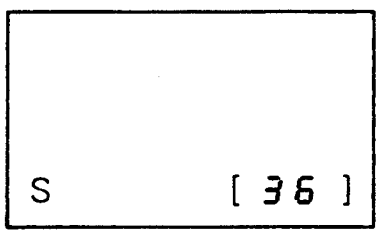
FIG. 16 shows various examples of the indication of the indication panel of the camera.
Figure 16:
Figure 16:
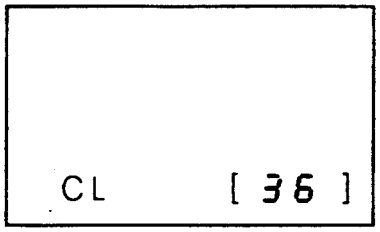
Figure 16:
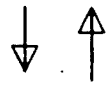
Figure 16:
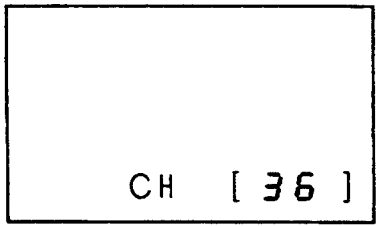
Figure 16:
Figure 16:
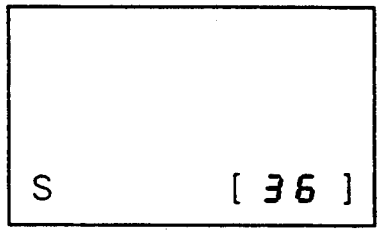
Figure 16:
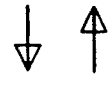
Figure 17:
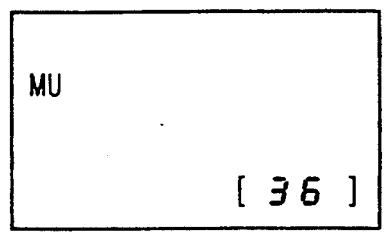
FIG. 17 shows various examples of the indication by the indication panel of the camera.
Figure 17:
Figure 17:
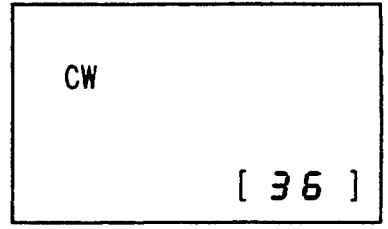
Figure 17:
Figure 17:
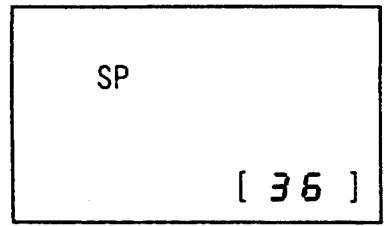
Figure 17:
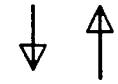
Figure 17:
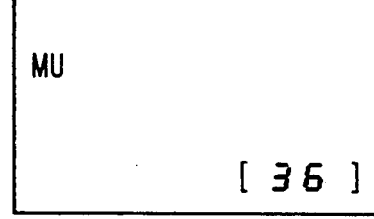
Figure 17:
Figure 18:
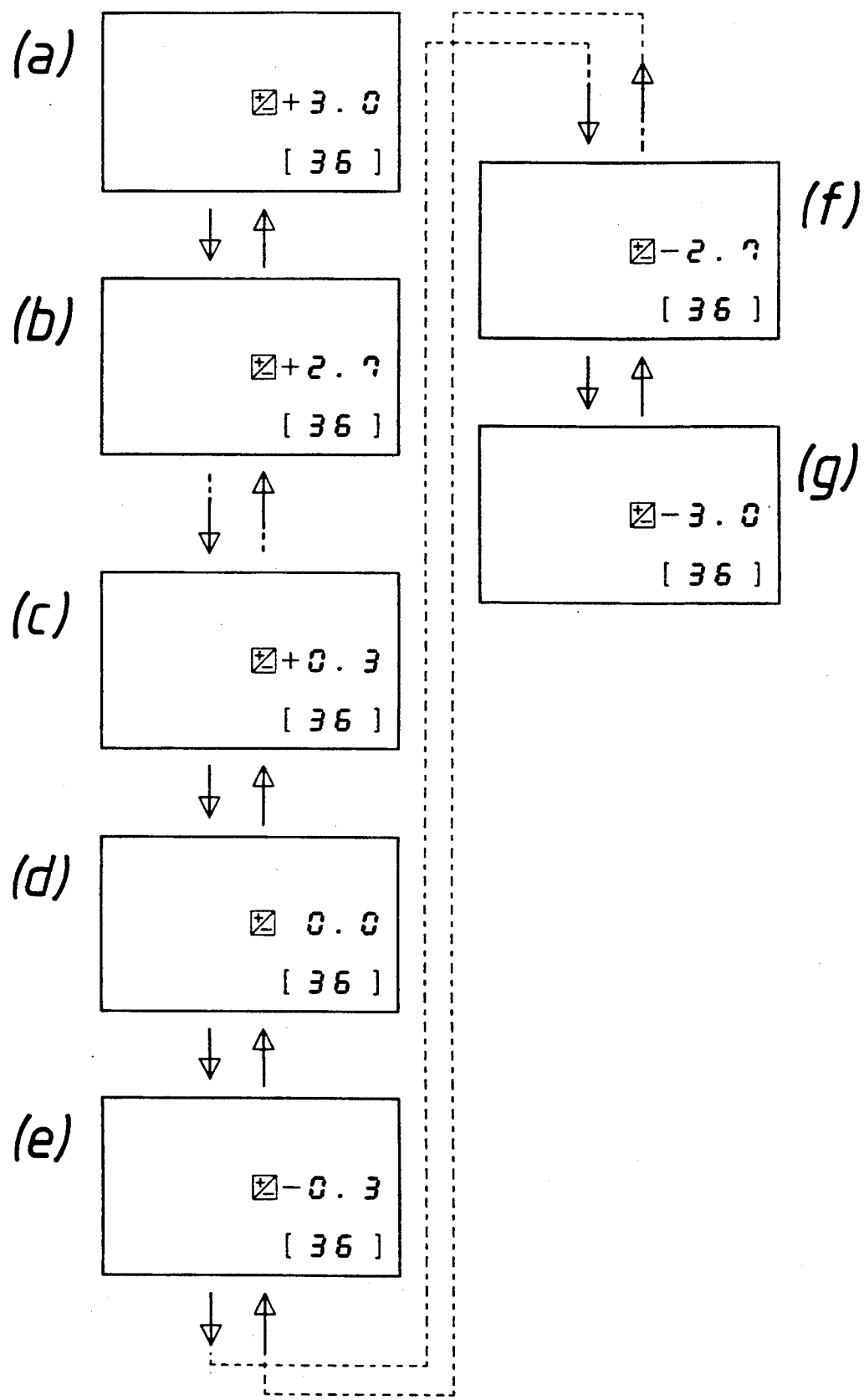
FIG. 18 shows various examples of the indication by the indication panel of the camera.

FIG. 14 shows the state of a change in the indication when the program continues to go round the loop from the step S2 via the steps S3, S4, S5, S7, S32 and S46 back to the step S2. Assuming that at first, the exposure mode is a program and the pointer SETN_0 is 0, if the MODE button continues to be depressed, the indication will become such as shown in FIG. 14(a). If from this state, the dial is rotated by one click in the right direction, the value of the two-phase counter CNTR becomes +1, and at the step S4, SETN_0 becomes 1, and the indication changes as shown in FIG. 14(b) and the setting of the exposure mode is changed from the program to the shutter-priority mode. If the dial likewise continued to be rotated, the indication changes to FIGS. 14(c) and (d), and at the next one click, the pointer SETN_0 exceeds 3 and becomes 0 by the processing at the step S5, and the indication changes to FIG. 14(e), i.e., returns to the indication shown in FIG. 14(a). In the manner described above, the setting of the exposure mode can be changed endlessly. When the dial is rotated in the left direction, the value of CNTR becomes negative and a change of the setting in the opposite direction as compared with the case of the rotation in the right direction is effected.

In the same manner, in the flows advancing rightwardly from respective one of steps S8, S14, S20 and S26, the dial is rotated while the ISO button, the DRIVE button, the light metering mode button and the exposure compensation button are depressed, whereby the film speed value, the film winding mode, the light metering mode and the exposure compensation amount become changeable in setting, and the changes in the indication at that time become such as shown in FIGS. 15, 16, 17 and 18. However, design is made such that when the setting of the exposure compensation amount is to be changed, at a step S29, the values of the pointers are limit-processed and only the exposure compensation amount is not endless but has its change of setting stopped at a limit value even if the dial continues to be rotated.

On the other hand, if for example, at the step S3, in the flow in a state in which the button for changing the setting of each operating mode continues to be depressed, it is judged that the level of the port P2 is L, that is, it is judged that the R button is depressed, advance is made to a step S6, where the pointer SETN _0 is reset to 0, and advance is made to a step S7. This means that when the R button is depressed while the MODE button is depressed, the exposure mode is changed to a program mode.

Figure 19:
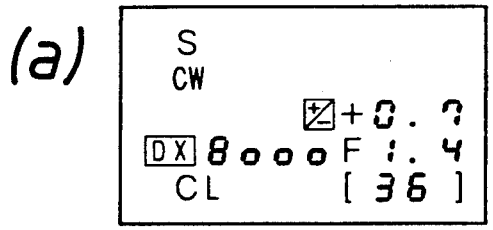
FIG. 19 shows various examples of the indication by the indication panel of the camera.
Figure 19:
Figure 19:
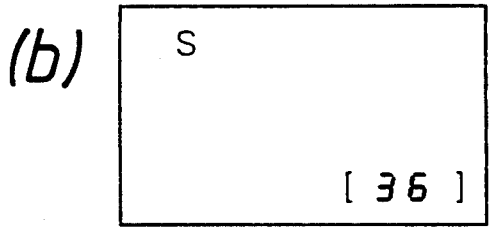
Figure 19:
Figure 19:
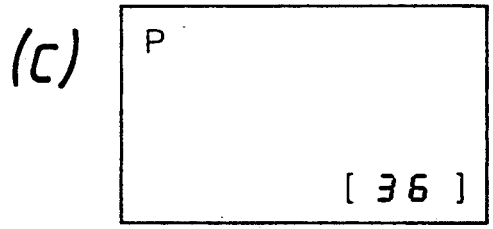
Figure 19:
Figure 19:
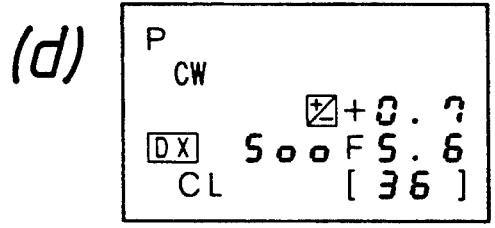
Figure 20:
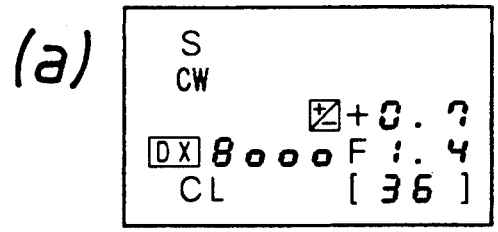
FIG. 20 shows various examples of the indication by the indication panel of the camera.
Figure 20:
Figure 20:
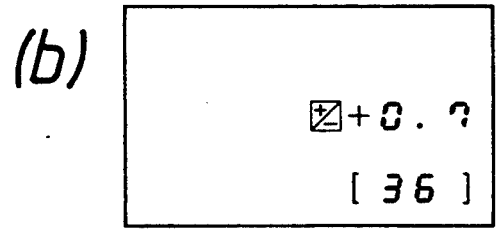
Figure 20:
Figure 20:
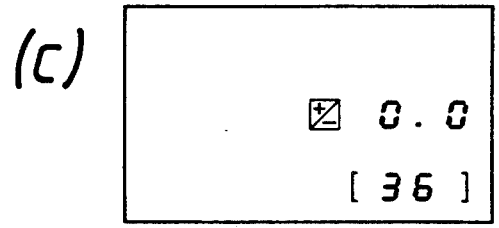
Figure 20:
Figure 20:
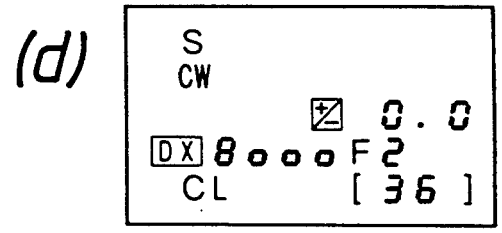

The change in the indication at that time is such that as shown in FIG. 19, when the MODE button is depressed from the initial state of FIG. 19(a), the indication changes over as shown in FIG. 19(b), and when the R button is then depressed, the exposure mode changes to a program mode as shown in FIG. 19(c). When the R button and the MODE button are both released, the normal indication in the program mode is effected as shown in FIG. 19(d). Likewise in the setting of the other operating modes, when the R button is depressed while the button for setting each operating mode is depressed, only the pointer indicative of that operating mode is reset to 0 and only the setting of that operating mode is reset to the regular standard setting. Particularly in the set resetting of the exposure compensation amount as shown in FIG. 20, even when the dial must be rotated by a great number of clicks to restore the set value to ±0 by only the dial as in the prior art, if the exposure compensation button is depressed from the state of FIG. 20(a) to bring about the indication state as shown in FIG. 20(b) and the R button is depressed to bring about the indication as shown in FIG. 20(c) and thereafter the two buttons are released, there can be simply realized a photographing state as shown in FIG. 20(d) in which the exposure compensation amount has been reset.

The custom set subroutine called at the step S42 of FIG. 5C will now be described with reference to the flow chart of FIG. 6 and FIG. 21 which shows the indication.

At a step S101, whether the level of a port P8 is L, that is, whether the AE locking button is depressed, is discriminated, and if the level of the port P8 is H, that is, if the AE locking button is not depressed, return is made on the spot, and if the level of the port P8 is L, that is, if the AE locking button is depressed, the original AE locking function is executed and also at a step S102, the indication "CUSTOM SET?" is blinked as shown in FIG. 21(b) to thereby press the user for the selection as to whether the current state should be re-registered as custom set. In that state, at a step S103, whether the level of the port P2 is L, that is, whether the R button is depressed, is judged, and if the level of the port P2 is H, that is, if the R button is not depressed, return is made, and if the level of the port P2 is L, that is, if the R button is depressed, advance is made to a step S104, where the substances of SETN_0-4 of the memories are all transferred to SETC_0-4, and then return is made. FIG. 21(a) shows a state in which no button is depressed, FIG. 21(b) shows a state in which the AE locking button is depressed, and FIG. 21(c) shows an indication state in which the R button is additionally depressed to re-register the current state as custom set, whereafter the two buttons are released.

The set resetting subroutine called at the step S43 of FIG. 5C is shown in FIGS. 7A and 7B.

First, at a step S201, whether the level of the port P2 is L, that is, whether the R button is depressed, is judged, and if the level of the port P2 is H, that is, if the R button is not depressed, advance is made to a step S202, where the flag PUSH_R is cleared, and advance is further made to a step S203, where the indication "CUSTOM" is turned off, and then return is made. On the other hand, if the level of the port P2 is L, that is, if the R button is depressed, advance is made to a step S204. At the step S204, whether the flag PUSH_R is 1 is judged and if this flag is 0, advance is made to a step S205, where the substances of SETC_0-4 of the memories are transferred to SETN_0-4, and at a step S206, the flag PUSH_R is set. Subsequently, advance is made to a step S207, where the timer TMR1 is reset and time counting is started, and at a step S208, the indication "CUSTOM" is turned on, and return is made. The flag PUSH_R is a flag for knowing whether the R button was depressed when this routine was passed through last time, and the operations of the steps S205-S208 are executed when the R button was not depressed last time, that is, only immediately after the depression of the R button, and the combination of the current settings of the operating modes is changed to the combination of the operating modes set in the custom set routine of FIG. 6, and the user is informed of this by the indication "CUSTOM". If thereafter the R button is immediately released, advance is made toward the step S202 by the branching-off of the step S201 when this routine is passed through next time, and the change in the indication in the above-described operation becomes such as shown in FIG. 22.

FIG. 22(a) shows the state before the buttons are depressed, and the camera changes over to the custom setting set by the user as shown in FIG. 22(b), in a moment immediately after the R button is depressed, and if the R button is then released, photographing can be continued in a state as shown in FIG. 22(c).

If the R button continues to be further depressed after the R button is depressed and the portions of the steps S205-S208 are executed, at a step S204, the judgment of the flag PUSH_R is done, whereupon advance is made toward a step S209, where whether two seconds has passed in TMR1 which started to count time at the step S207 is judged. If the answer is "No", return is immediately made, but when this state continues for two seconds or longer, the program soon proceeds from the step S209 to a step S210.

At the step S210, the contents of the memories SETN_0-4 are all reset to 0, and at a step S211, the indication of the operating modes corresponding to them is effected. That is, at this point of time, the setting of the operating modes is collectively reset to a regular standard combination. Next, at a step S212, the indication "CUSTOM CLR?" is blinked to attract the user's attention, and at a step S213, the rising of the port P2, i.e., the releasing of the R button, is waited for, and when this port rises, at a step S214, the time counting by the timer TMR2 is started. At step S215 and S216, the timer TMR2 counting one second and the port P2 falling to L (the R button being again depressed) are waited for at a time, and if one second has passed without the R button being depressed, return is made without anything being done, and when the R button is again depressed within one second, at a step S217, the memories SETC_0-4 are all reset to 0 and return is made.

The operations of the step S204 via the step S209 to the step S217, if described by the use of FIG. 23 showing the change in the indication at that time, will be as follows.

Immediately after the R button has been depressed from a state in which no button is depressed (FIG. 23(a)), the indication changes over to a combination of custom settings previously set by the user, as shown in FIG. 23(b), and at the same time, the indication "CUSTOM" is turned on. If the R button continues to be depressed for two seconds, the indication now changes over to a combination of regular standard settings as shown in FIG. 23(c) and also, the indication "CUSTOM CLR?" starts to blink to thereby warn the user as to whether the custom setting itself may be reset to a combination of regular standard settings. If here the R button is once released and then is again depressed within one second, the custom setting itself is truly reset, but if the R button is left as it is for one second, the custom setting itself will remain unchanged. In any case, at the next stage, photographing can be continued with the indication being a combination of operating modes reset to a regular standard state as shown in FIG. 23(d).

As another variation of the operation in this connection, there is a case where the execution of the step S210 is omitted, and in such case, when the R button continues to be depressed for two seconds or longer, shift is made to a state in which the custom setting itself can be reset while the current setting remains to be the combination of custom settings previously reset, as shown in FIG. 24(c). FIGS. 24(a)-(d) show how the change in the indication differs due to the above-described difference in the variation, in contrast with the timings of the same operations as those of FIGS. 23(a)-(d).

As described above, in the present embodiment, there is realized the function of resetting only the necessary operating mode to the standard setting, by depressing the R button with each operating mode setting button depressed, as shown at the steps S2–S32 in the flow charts of FIGS. 5A–5C.

Also, there is realized the function of registering and memorizing a combination of the settings of the operating modes desired by the user as the custom setting, by using the AE locking button and the R button together, as shown in the custom set subroutine of FIG. 6.

Further, there is realized the function of replacing the custom setting itself with the standard setting, by resetting the setting of the current operating mode to a combination of custom settings if only the R button is once depressed, and further resetting the setting of the current operating mode to a combination of regular standard settings if the R button continues to be depressed for two seconds or longer, and depressing the R button once again within one second after the R button is released, as shown in the set resetting subroutine of Figures 7A and 7B. Design is also made such that this function is operatively associated with the indication to enable the user to operate the camera comprehensibly. There is also shown a variation in which when the R button continues to be depressed for two seconds or longer, the current setting is left as the custom setting and the function of replacing the custom setting with the standard setting is similar.

The present embodiment also discloses the technique of registering and memorizing the combination of custom settings, but the set resetting subroutine shown in FIGS. 7A and 7B is effective irrespective of a method of registering the custom setting and therefore, design may be made such that the registration of the custom setting is memorized in the camera body by the data communication with the camera body, with an accessory such as a data back, a personal computer or an electronic notebook connected, for example, to the camera body being endowed with setting means such as an operating member and an indicator therefor.

As described above in detail, according to a preferred embodiment of the present invention, the function of an operating mode which need not be changed can be left as it is and only the set value mode of a function which it is desired to restore to the standard setting can be easily reset and therefore, only the set value of a function the setting of which is cumbersome to change can be restored to the standard value in a moment.

According to another embodiment of the present invention, it becomes possible to endow the camera with the function of easily registering and memorizing a combination of custom settings peculiar to the user without carrying out the cumbersome operation of mounting an accessory or the like and without involving such demerits as the increased cost and increased space resulting from adding a setting operation member for exclusive use.

According to still another embodiment of the present invention, even in a system in which when it is desired to once release the custom set value itself and restore it to the standard state, the change or registration of the custom set value are impossible unless by an extraneous accessory, it becomes readily possible by the camera body alone without the addition of any special operating member or the like.

According to yet still another embodiment, there are obtained such effects as comfortable feeling of operation and prevention of wrong erasing.

What is claimed is:

1. An information setting apparatus in a camera including:
   selecting operation means having a plurality of operating portions operated to select one of a plurality of functions when the set values of said plurality of functions are to be changed;

changing operation means operated to change the set value of said selected function;

resetting operation means having an operating portion for resetting all of the set values of said plurality of functions to a predetermined standard value; and individual resetting means for resetting only the selected function to said predetermined standard value when one of the operating portions of said selecting operation means and said resetting operation means are operated together.

2. An information setting apparatus in a camera including:

selecting operation means having a plurality of operating portions operated to select one of a plurality of functions when the set values of said plurality of functions are to be changed;

changing operation means operated to change the set value of said selected function;

first operating means;

custom set value memory means for memorizing a combination of set values set by the user's will with respect to the set values of said plurality of functions;

second operating means for resetting all of the current set values of said plurality of functions to the combination of the set values by the memorized contents of said custom set value memory means; and custom set registering means for transferring the currently set value to said custom set value memory means when said first operating means and said second operating means are operated together.

3. An information setting apparatus according to claim 2, wherein said first operating means is an AE locking operating member.

4. An information setting apparatus in a camera including:

selecting operation means having a plurality of operating portions operated to select one of a plurality of functions when the set values of said plurality of functions are to be changed;

changing operation means operated to change the set value of said selected function;

custom set value memory means for memorizing a combination of set values set by the user's will with respect to the set values of said plurality of functions;

resetting operation means operated when the set values of said functions are to be reset;

first set resetting means for changing all of the set values of said plurality of functions to said custom set values when it is detected that the operation of said resetting operation means has been started;

second set resetting means for outputting a demand signal for replacing all of said custom set values with a predetermined standard set value when it is detected that said resetting operation means has been operated for a predetermined first time or longer, and replacing all of the memorized contents of said custom set value memory means with a predetermined standard set value when it is detected that said resetting operation means has been reoperated for a predetermined second time or longer after it has once become inoperative.

5. An information setting apparatus according to claim 4, wherein said first time is longer than said second time.

* * * * *